(12) United States Patent
Bender (10) Patent No.: US 10,375,041 B2
(45) Date of Patent: Aug. 6, 2019

(54) METHOD, SYSTEM, AND APPARATUS FOR SECURE WIRELESS CONNECTION GENERATION

(71) Applicant: Andrew L. Bender, Ambler, PA (US)

(72) Inventor: Andrew L. Bender, Ambler, PA (US)

(*) Notice: Subject to any disclaimer, the term of this patent is extended or adjusted under 35 U.S.C. 154(b) by 225 days.

(21) Appl. No.: 15/131,495

(22) Filed: Apr. 18, 2016

(65) Prior Publication Data

US 2016/0359820 A1 Dec. 8, 2016

Related U.S. Application Data

(60) Provisional application No. 62/148,821, filed on Apr. 17, 2015.

(51) Int. Cl.
*H04L 29/00* (2006.01)
*H04L 29/06* (2006.01)
*H04L 9/08* (2006.01)
*H04W 12/04* (2009.01)
*H04L 9/14* (2006.01)

(52) U.S. Cl.
CPC .......... *H04L 63/0442* (2013.01); *H04L 9/083* (2013.01); *H04L 9/0869* (2013.01); *H04L 9/0891* (2013.01); *H04L 9/14* (2013.01); *H04L 63/0435* (2013.01); *H04L 63/061* (2013.01); *H04L 63/062* (2013.01); *H04L 63/068* (2013.01); *H04L 63/18* (2013.01); *H04W 12/04* (2013.01); *H04L 63/0492* (2013.01); *H04L 2209/12* (2013.01); *H04L 2209/24* (2013.01); *H04L 2209/80* (2013.01)

(58) Field of Classification Search
CPC . H04L 63/0442; H04L 63/062; H04L 9/0869; H04L 9/083; H04L 63/068; H04L 9/0891; H04L 63/0492; H04L 2209/24; H04L 2209/80; H04L 2209/12; H04L 63/0435; H04W 12/04
See application file for complete search history.

(56) References Cited

U.S. PATENT DOCUMENTS

| | | | | |
|---|---|---|---|---|
| 2002/0035687 A1* | 3/2002 | Skantze | ............... | H04L 9/0825 713/168 |
| 2004/0068631 A1* | 4/2004 | Ukeda | ................... | G06F 21/10 711/163 |
| 2007/0016663 A1* | 1/2007 | Weis | ................... | G06F 11/2028 709/223 |
| 2015/0350895 A1* | 12/2015 | Brander | ................. | H04L 51/04 455/411 |

* cited by examiner

*Primary Examiner* — Don G Zhao
(74) *Attorney, Agent, or Firm* — Fox Rothschild LLP (57) ABSTRACT

Provided is a system and apparatus employing an extremely secure method of encrypting both wireless internet connections and wireless peripherals to a computer, cellphone, tablet, TV, stereo, or any other wireless device. The method differs from other techniques in that it generates more unique random seeds from which to generate incredibly long security keys between two or more devices. The system also acts as a filter between computers and devices so that infected devices cannot infect the host when generating keys. It uses secure data cables which generate no electromagnetic fields. It can also detect an attempt to tap into the line to snoop on the keys created. It also generates private/private security keys for wireless/internet use.

17 Claims, 7 Drawing Sheets

METHOD, SYSTEM, AND APPARATUS FOR SECURE WIRELESS CONNECTION GENERATION

RELATED APPLICATIONS

This application claims priority to the U.S. Provisional Application Ser No. 62/148,821 filed on Apr. 17, 2015, the content of which is incorporated herein by reference in its entirety.

FIELD OF THE INVENTION

The present disclosure relates to securing wireless internet, cellphone, and other similar connections and securing the wireless connection of peripherals to a device such as keyboards, mice, headphones and so on to a computer, cellphone or other device.

BACKGROUND

Current wireless communications do not provide for natively secure wireless connection between peripherals and computing devices. Nearly all of Bluetooth-enabled wireless devices (or an 802.11x device) are backwards compatible to versions of the relevant protocol with known security holes in them. Thus, they may be easily hacked. It is simply a matter of connecting to the device using one of these hacked protocols, giving the hacker nearly complete access to the device being hacked. Therefore, a new method of generating secure private/private security keys and using more secure methods of encryption is necessary so that it is next to impossible to hack such a connection protected by private/private key encryption. Additionally, a development to securely distribute private/private security keys to both parties is necessary. Once both parties have private security keys, secure connections may be generated that protect both parties from eavesdropping. Accordingly, these new and improved encryption devices and methods are desirable for such, and other similar systems.

SUMMARY

The present disclosure provides a method, system, and apparatus capable of securely transmitting data over wireless and wired connections to the internet and/or other networks via cellphones, computers and/or other devices. Natively secure short-range (e.g., approximately 10 meters) wireless connection of peripherals to a device may also be provided.

In one aspect of the invention, an encryption device is described for establishing encrypted communications channels between a first device and a second device. In one embodiment the encryption device comprise a processor with memory; a first wired connection for connecting to said first device; a second wired connection for connecting to said second device, one or more peripherals; and software, stored in said memory and execute by said processor. The software performs the functions of: (a) reading data from the one or more peripherals and generating one or more random number seeds from the data; (b) generating a set of public/private encryption keys using one of the random number seeds; (c) encrypting connections to the first and second devices using a public/private encryption keys over a first and second wired connections, respectively; (d) generating one or more private/private encryption keys using one or more of the random number seeds; and (e) transmitting the one or more private/private encryption keys to the first and said second devices over the first and second wired connections, respectively. In another embodiment, the first or second devices are the same device.

Embodiments described in the present disclosure are superior to conventional methods. It can operate at any bit rate. In one embodiment it can begin with very large encryption key lengths (e.g., 2048 bits or greater, or preferably 5120 bits or longer) and has no backwards-compatibility. Further, the encryption protocol can be completely replaced every upgrade period (e.g., every two years) with a new, more secure, protocol (e.g., approximately 1024 bits more secure) than the last protocol with any security vulnerabilities being patched. This means that all devices using the development require a user-upgradeable encryption chip that will be replaced every upgrade period with the new more secure chip.

Besides upgrading the standard by approximately 1024 bits (more or less) per upgrade period, devices based on the development may first be activated by plugging them in using a wired connection to a new development designed to generate long, random private/private encryption keys. The development is contained within an external housing which plugs into both the host device and to the peripheral device, and that handshakes three or more times using public/private encryption keys of different protocols with each device using digital optical or similar connections which do not generate EM fields which can be eavesdropped upon.

The development is an external box containing a CPU, APU, GPU, and/or a SOC or other processor which takes input from a video camera, audio microphone, and a touchpad, and/or other input devices, and using all of them, generates extremely long random number seeds which are used to generate 2048 or greater, including 5120 bits or greater sets of encryption keys. This will multiple-encrypt the data sent to both the host and the device at the new higher bit security rate, and the external box acts as a "filter" preventing the host from infecting the device with spyware or a virus, etc., and vice versa.

In certain preferred aspects, at least three sets of keys will be generated and sent to both devices. The first set will make a connection, then the second set will make a completely hidden second, third, or more than three encrypted connections of different protocols. In one embodiment, after all the public/private connections are made, a private/private connection may also be made to further secure the connection. After connecting, anywhere from one or more sets of three or more encryption keys of differing protocols will be sent to each device or computer/host. The encryption keys generated will expire after a predetermined amount of time, (preferably approximately every 30 days using the onboard clock synchronized with the host and device), and must be renewed before the key expires and the wireless connection stops working, and the device must get plugged into the development to get a new set of private/private encryption keys (preferably before the allotted time period has expired).

In alternative embodiments, for devices like cellphones which are more difficult to bring to your provider each month, as many as twelve or more sets of three or more encryption keys can be stored on both devices in approximately 10240 bit or greater encryption "safes" on each device. Periodically, the current set of keys may be destroyed, and three or more new ones may be retrieved from the safe on both the host and the device, determined by the clocks on each device. The clock on the development is set at the manufacturer with a battery to power it whose time cannot be changed once set.

BRIEF DESCRIPTION OF THE DRAWINGS

Embodiments will be described with reference to the following drawing figures, in which like numerals represent like items throughout the figures, and in which.

DETAILED DESCRIPTION

Before the present methods and systems are described, it is to be understood that this invention is not limited to the particular systems, methodologies or protocols described, as these may vary. The terminology used herein is for the purpose of describing particular embodiments only, and is not intended to limit the scope of the present disclosure which will be limited only by the appended claims.

As used herein and in the appended claims, the singular forms "a," "an," and "the" include both the singular and plural references unless the context clearly dictates otherwise. Unless defined otherwise, all technical and scientific terms used herein have the same meanings as commonly understood by one of ordinary skill in the art. As used herein, the term "comprising" means "including, but not limited to.

The present disclosure provides an incredibly secure encryption device and method that minimizes the ability of the associated system to be hacked. More specifically, extremely random keys will be generated after communicating, so the resulting keys are only seen by the processor that generates them, and the host and device connected to it. The development can use inputs including, but not limited to, images taken from a video camera, sound from a microphone, touch from a touchpad, and a clock and combine them to generate an extremely random number seed that does not repeat or have any pattern that can be devised easily. Using an extremely random number seed avoids many problems with conventional computer-based random number generators. Public and private encryption keys are derived from this extremely random number seed and which each use different inputs (combinations of images, sounds, clock, and touch patterns etc.) for each key generated (in combination with a random number generator).

To prevent a hacked device from corrupting this process, the development should be contained separately from the host and device in its own housing. In some scenarios, it may use, but not be limited to, an error-correcting code (ECC) random access memory (RAM, preferably registered). In some scenarios, it may have some electromagnetic (EM) shielding of its CPU, memory, housing and other components to prevent EM attacks. It may have its own power supply, such as, but not limited to, a battery, or being plugged into a standard outlet using built-in surge suppression so that it cannot be crashed, overloaded or otherwise corrupted or damaged by corrupting its power supply. In this context, "device" refers to any possible type of computer, server, peripheral, cellphone, and so on that uses any embodiment of the development on it.

The development may use data cables such as, but not limited to digital optical cables, capable of only transmitting data, and nothing else that could corrupt the process, or be easily spliced without detection. The development may be capable of detecting the loss of signal a splice would create, or by detecting the changed quantum state of the photons sent, if they were observed enroute, and notify the user of such an event. Additionally, optical cables do not generate EM fields which can be intercepted and/or otherwise surveilled.

In a scenario, the only unencrypted data that is sent over the cables to the host and device may be, but is not limited to, an identifying time and date (e.g. day, moth, year, hour, minute and second) encryption strength, and version of the encryption box, a randomly generated identifying number for the host and peripheral devices so they know which protocols to use to connect with one another, which is changed each time encryption keys are changed and a version of the development software/hardware the devices are running. Also, an acknowledgment that the information and version was sent and a request for sets of security keys. The development would then create one or more different secure connections to both host and device (preferably but not limited to being done simultaneously) by handshaking three or more times with both the host and peripheral using, but not limited to three or more sets of public and private keys. It will connect using the first set of keys, then, will immediately thereafter connect again over the first encrypted connection with the second set of keys, and so on further encrypting the connection three or more times. This may be done to prevent supercomputers from decrypting the connection in real-time as the connection is being established. If done fewer than three times, a supercomputer could potentially decrypt it.

Thereafter, it will potentially generate private/private security keys to further encrypt the wired connection, and then create and send three or more sets of randomly generated private/private encryption keys of differing protocols to the host and peripheral over the secure connection. If the development is connected to the host and a peripheral is later plugged in to it, a completely new set of keys should be created for connecting to both host and device again before the new sets of keys are sent to both devices. If there is a failure at any point in the process, preferably it will start over.

The development will preferably have, but not be limited to having optical digital connections for the host and peripheral devices, a digital video camera, a microphone, a touchpad, a clock (a highly accurate atomic clock is preferred, but any reasonably accurate clock will be sufficient), a power connector, and/or a battery (preferably rechargeable). Preferably, it will use a power adapter that has surge suppression and will reduce the voltage only to what is necessary. Preferably, the binary input/output system (BIOS) of a device is not software upgradable, only hardware upgradable, and uses only ROM (Read-Only Memory). The device's audio/video touchpad and other inputs will connect directly to the processor(s) which should contain the programming, memory, inputs, and all other necessary processing and code to accomplish the tasks described above.

Versions of the software for the host PC or devices will need to be written preferably as simply as possible that will query the device for a new set of keys, preferably make three or more secure public/private connections of three or more protocols, with the device, potentially create a private/ private secure wired connection, acquire three or more sets of randomly generated high bit private/private encryption keys of three or more different protocols, and store those keys, encrypted using keys approximately twice as long as those used to secure the wireless connections on both the host and peripheral devices. Each new peripheral, computer, or device attached to the development will receive three or more unique sets of encryption keys. The host and device (either a peripheral or wireless PC, laptop, tablet, etc.) can then connect wirelessly using three or more sets of private/private encryption keys, using three or more encryption protocols such as AES, Twofish, Serpent, or other protocols, creating a multiple encrypted truly secure wireless connection that cannot be easily hacked by anyone, even governments. Additionally, the connection may detect if more than one computer or device attempts to connect to the wireless connection, and alert the user that the connection is not secure, and to get new encryption keys.

Figure 1:
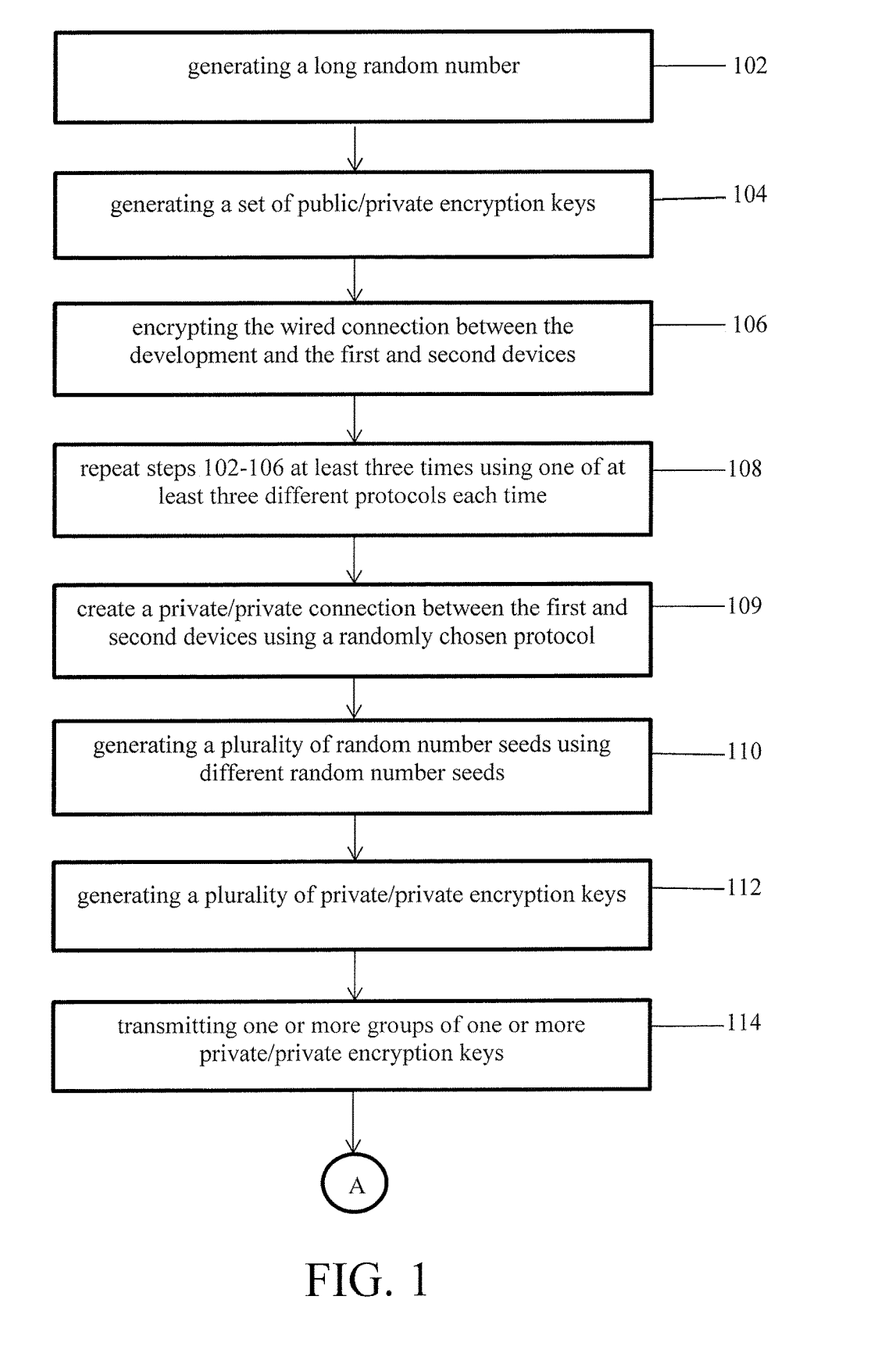
FIG. 1 is a flow chart showing a method of encrypting a data connection.
Figure 2:
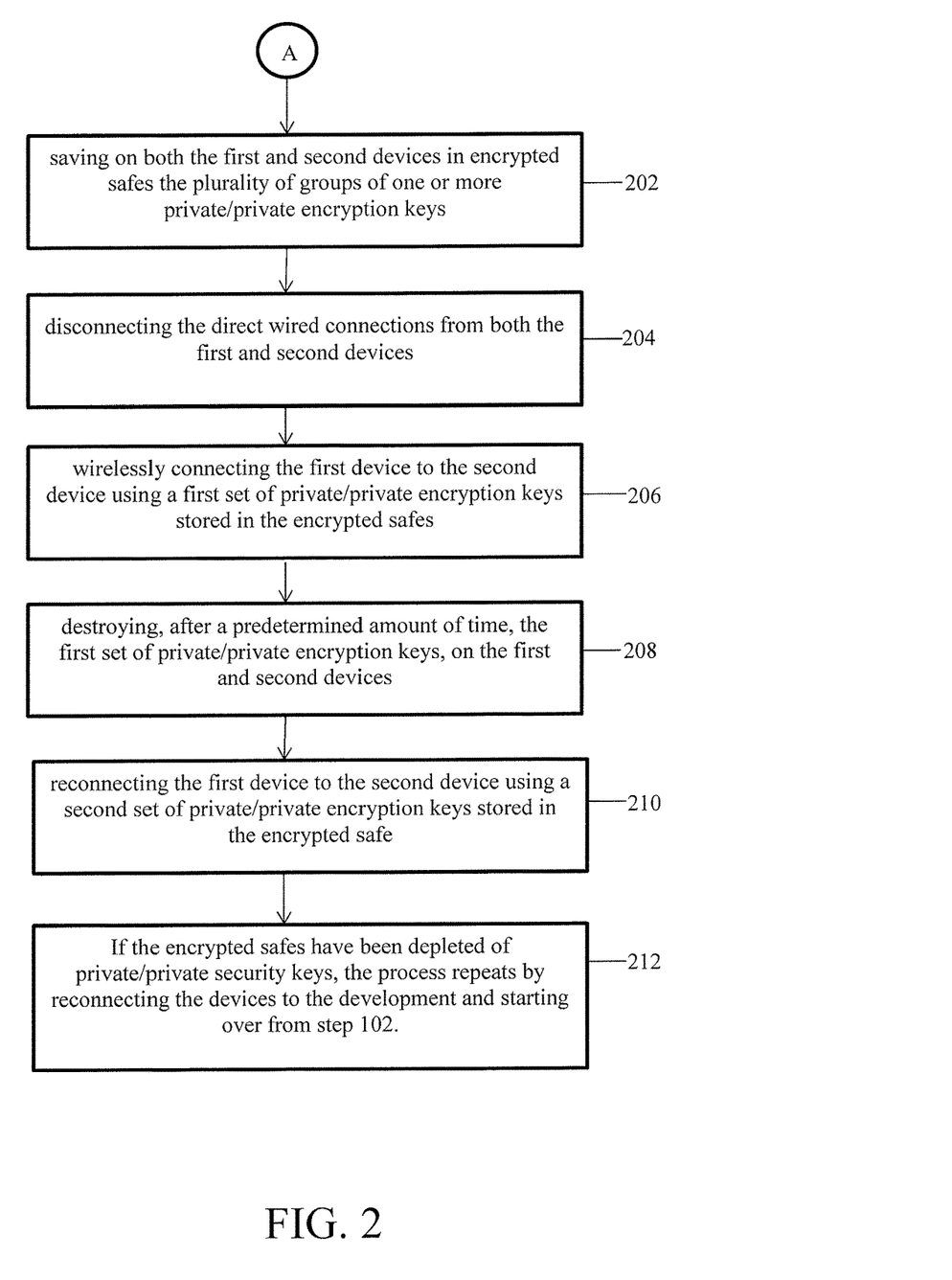
FIG. 2 is a flow chart showing a method of encrypting a data connection.

In a preferred embodiment, a custom secure random encryption key generator device which preferably takes many inputs such as video, sound, touch, etc. (audio, camera, touchpad, onboard clock, and a random number generator) to generate long random number seeds (step 102) which very long encryption keys can be generated of any bit rates, for example 2048 bits or greater, or preferably 5120 bits or more. After connecting preferably securely using the public/private encryption keys of different protocols, it will connect to both host and peripheral devices and the connections are made via digital optical or similar cables. These cables use multiple different frequencies of light both for upstream and downstream connections. For example, red, green, yellow and blue light to the device and a one-half frequency light higher red, green, yellow and blue light from the device. The device only sends minimal data to host and peripheral devices whose keys are preferably stored encrypted on the host and device so that the no infection can be sent to the host from the peripheral, or vice versa. The device accepts only expected data, and no more. During each step, the device only allows the expected type of data, e.g., an encryption key or video color and location data. Anything outside those parameters is ignored. After communicating what version chip the device uses, the number of keys requested, and the time and date, the device will connect to the host and peripheral devices using the previously generated three or more sets of public/private encryption keys (step 104). The wired connection between the development and the first and second devices is then encrypted (step 106). Steps 102 through 106 are repeated a minimum of three times using a minimum of three different protocols (step 108) then, at least one private/private wired connection can be created on top of the three or more public/private connections (step 109). Then, a plurality of private/private encryption keys of a plurality of encryption protocols is sent to the host and peripheral devices (steps 110-114). The development will send anywhere from one to twelve or more sets of a plurality of encryption keys for the next month to year or more of secure wireless protocols with no public communication keys. The host and peripheral store the encryption keys in a safe on each device encrypted at about twice the bit encryption rate of the wireless keys (approximately 10240 bit encryption or greater to start) (step 202), and will retrieve them as necessary. The host and device will then disconnect from their wired connection (step 204), and using a set of one or more private/private encryption keys, will connect securely wirelessly (step 206).

In an example embodiment utilizing video/audio and touch inputs, the processor and memory may only accept data within a certain range, and no others. For example, video inputs will only accept pixel data with pixel number (location) and color shade, and will disregard any input that falls outside those parameters. The processor may also employ error checking and correcting of recorded data. Data may be stored as non-executable.

In another example embodiment utilizing audio input, the input may be stored as non-executable data that may fall within certain parameters to be recorded. For example, data such as volume, pitch, and waveform may be stored temporarily in memory, and any data outside those parameters may be ignored. The data may also be error checked and corrected.

In another example embodiment utilizing touch pad information, information such as location and pressure may be recorded temporarily into memory, and any data falling outside those parameters may be ignored. The data may also be error checked and corrected.

By limiting saved information from any source to data expected to be received by that particular device, and not allowing any other data, hacking attempts that take advantage of peripherals can be thwarted. For example, corrupted digital inputs are a major source of hacking attempts. Data sent to a printer, for example, should contain only data required to print a document. All other data may be ignored by the sending and receiving devices. If a device needs updating, a physical BIOS chip may be supplied. In an embodiment, no BIOS flashing may be allowed.

Embodiments may preferably use dual-redundant processors as well. For example, if the results from one processor disagree with those of another, the processing will start over.

Devices that attach to the development may also meet minimum safety requirements. For example, embodiments may use error checking and correction (ECC) RAM. Embodiments may have an optical data port like the development's. In a preferred embodiment, only the disclosed wireless protocol is acceptable. In this embodiment, no device may use Bluetooth or 802.11x as well. For example, all wireless drivers and power to the wireless receiver and transmitter may be shut off during the key generation process so they may not be used to eavesdrop on the process. Devices may have onboard batteries and power purification systems to prevent spikes, blackouts and brownouts. For example, if the power supply deviates from the norm, the key generation process may restart. In some embodiments, all ports, such as USB, Firewire, HDMI, etc. may be powered down during the key generation process and reactivated when the process is complete, so they cannot be used to corrupt the key generation process. Memory slots such as SD, SDHC, microSD, etc. may also be powered down and shut off during this process as well as drivers shut down until the process is complete.

In some embodiments, an electromagnetic (EM) attack on the development may be detected by the dual redundant processors, and may cause the key generation process to restart. An EM attack on the development or one of the attached devices may also be detected as multiple ECC violations, which will be reported to the development, which may restart the key generation process if those violations are detected.

In addition to the DC wall adapter, the development may have an on-board rechargeable battery that will purify all incoming power, preventing spikes, brownouts and blackouts, and making sure the development is receiving a constant and unchanging power supply. Any change in voltage may cause the encryption process to restart from the beginning until it can create keys using a pure power supply.

In a scenario, a device uses digital optical or other similar wired connections to communicate securely between host and device. This will prevent electromagnetic eavesdropping on the connection because copper wires generate electromagnetic fields which can be detected and eavesdropped upon. Preferably the connection can only transmit data, and will not "leak" any information and can detect a loss or drop in signal if spliced or if the connection is otherwise compromised. It can use different frequencies of light for transmitting and receiving data so it only requires one data cable per device, not two per device as some current optical cables do.

In a scenario, the disclosed system sends and receives identifying information preferably from both host and device over the wired connection so that all devices know certain information such as but not limited to what version of software/hardware each device is running, the strength and number of encryption keys needed, and requests for new keys from the host and/or device. Preferably, the development will alert the host when a new device is attached and keys are requested.

In a scenario, the disclosed system uses video, sound, touch, random number generator and/or other inputs in order to generate a random number seed to generate three or more sets of very high bit encryption keys.

In a scenario, the disclosed system creates as many sets of encryption keys of as many protocols as is necessary to completely secure the wired connection between host and device(s). It will be predetermined by the development's processor how many sets of (3 or more) public/private encryption keys will be used to connect the development to the host and peripheral. The development will randomly choose 3 or more encryption protocols to use in a random order to make the signal more difficult to eavesdrop upon. First, it connects using one encryption protocol, then, once encrypted, it chooses a second protocol, and makes a secondary encrypted connection, then does this a third time with a third protocol. Potentially, a private/private wired connection may also be created on top of the previous secure public/private connections. This should prevent the wired connection from being eavesdropped upon.

In a scenario, the disclosed system generates one or more sets of encryption keys using one or more encryption protocols which will encrypt the storage of the private encryption keys on both the host and peripheral device at approximately twice or more the bit-length encryption of the wireless connections.

In a scenario, the disclosed system generates one or more sets of private/private encryption key(s) using one or more different encryption protocols which are stored encrypted on both host and device so that they can later communicate wirelessly using these sets of private/private encryption keys of one or more different encryption protocols.

In a scenario, the disclosed system preferably causes the wireless private/private keys above to expire after a predetermined amount of time (step 208). If there are still sets of private/private keys in the safe, the next set of keys will be used at a predetermined time by the first and second devices in order to reconnect (step 210). If the safe has been depleted of private/private security keys, the devices will need to be reconnected to the development in order to generate new sets of private/private security keys (step 212), and then start over from step 102.

In a scenario, the disclosed system preferably uses ECC RAM to check for and correct errors.

In a scenario, the disclosed system preferably uses electromagnetic shielding to prevent electromagnetic (EM) hacking attempts.

In a scenario, the disclosed system preferably uses a battery or a power supply that protects from power surges which may be used to attack it.

In a scenario, the disclosed system, after a predetermined amount of time, will preferably require a new encryption chip of a higher encryption bit rate to more securely connect the host and peripheral devices as computing/supercomputing power increases.

In a scenario, the system, after creating all encryption keys necessary, overwrites all information pertaining to the creation of all encryption keys and connections from its memory using a Gutmann algorithm or other secure wiping protocols.

In a scenario, the system may also overwrite all encryption keys and data used to create the final private security keys and the encryption protecting them.

In a scenario, the present system contains a CPU, APU, GPU, SOC, or other processor which preferably contains all of the programming, memory and inputs in order to achieve all previous claims, but is not limited to that processor.

In a scenario, the system preferably requires a new encryption chip with more complex encryption and all known security flaws patched every upgrade period, which is preferably every two years, but could be any amount of time. The connections will no longer function after the upgrade period ends. A new processor will need to be purchased and installed before the period ends to ensure continued service. The upgrade period will be determined by the manufacturer, but will probably be every two years. The new chip will have an increase in the encryption bitrate or technology (e.g. go from 5120 bits to 6144 bits. The safe will also be increased in bitrate e.g. from 10240 bits to 12288 bit encryption.

Figure 3:
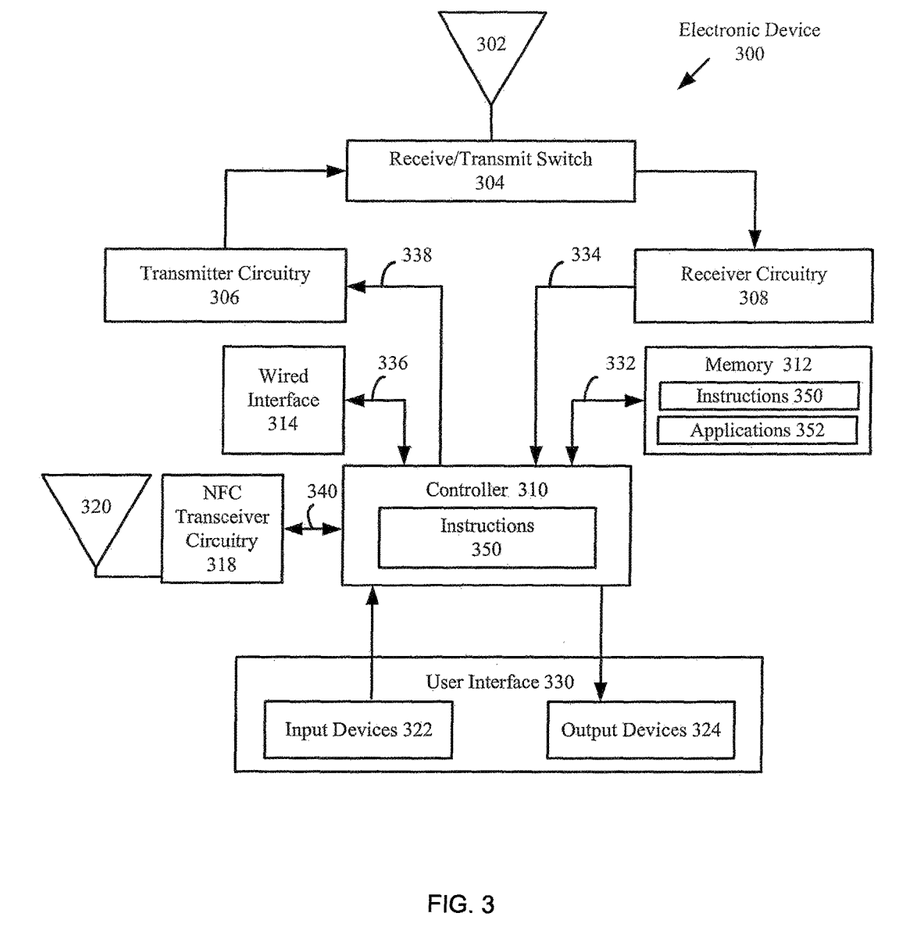
FIG. 3 is a block diagram of an example electronic communication device.

FIG. 3 provides a diagram of a communication device 300. As shown in FIG. 3, the communication device 300 may include an antenna 302 or other structure for receiving and transmitting short range communications such as Radio Frequency (RF) signals. A receive/transmit (Rx/Tx) switch 304 selectively couples the antenna 302 to the transmitter circuitry 306 and receiver circuitry 308 in a manner familiar to those skilled in the art. The electronic device may include receiver circuitry 308 which demodulates and decodes the signals received from a network or wireless access point to derive information therefrom. The receiver circuitry 308 is coupled to a controller 310 via an electrical connection 334. The receiver circuitry 308 provides the decoded signal information to the controller 310. The controller 310 uses the decoded signal information in accordance with the function(s) of the electronic device 300. The controller 310 also provides information to the transmitter circuitry 306 for encoding and modulating information into RF signals. Accordingly, the controller 310 is coupled to the transmitter circuitry 306 via an electrical connection 338. The transmitter circuitry 306 communicates the signals to the antenna 302 for transmission to an external device.

Wired interface 314 allows for secure transmitting and receiving of encryption signals. Encryption signals are used to transmit information to another device coupled to communication device 300 via wired connection 314 over electrical connection 336. Transmitted information can include encryption keys, encrypted information, and the like. The embodiments of the present disclosure are not limited in this regard.

The electronic device also may be enabled to support Near Field Communication (NFC). If so, an antenna 320 may be coupled with NFC transceiver circuitry 318 which is electrically connected to controller 310 via connection 340 for transmitting and receiving NFC signals. NFC signals are used to transmit small amounts of information over a short distance by placing the device near another NFC enabled object. The embodiments of the present disclosure are not limited in this regard.

The controller 310 stores the decoded short range (e.g., RF or NFC) signal information and the decoded wired interface information in a memory 312 of the electronic device 300. Accordingly, the memory 312 is connected to and accessible by the controller 310 through an electrical connection 332. The memory 312 can be a volatile memory and/or a non-volatile memory. For example, the memory 312 can include, but is not limited to, a Random Access Memory (RAM), a Dynamic Random Access Memory (DRAM), a Static Random Access Memory (SRAM), Read-Only Memory (ROM), and flash memory. Whatever type of memory is used, ECC code will be built-in to check for and correct errors. The memory 312 can also have stored therein instructions 350 and one or more software applications 352. Memory 312 may include a highly encrypted safe where private/private encryption keys are stored.

The software applications 352 or one or more features of the software applications may include, but are not limited to, applications operative to encrypt wired and wireless connections; operational information services, commerce services, email services, web based services, and/or electronic calendar services. As shown in FIG. 3, one or more sets of instructions 350 are also stored in the memory 312 connected to the controller via wired connection 332. The instructions 350 can also reside, completely or at least partially, within the controller 310 during execution thereof by the electronic device 300. In this regard, the memory 312 and the controller 310 can constitute machine-readable media. The term "machine-readable media", as used here, refers to a single non-transitory medium or multiple non-transitory media that store the one or more sets of instructions 350. The term "machine-readable media", as used here, also refers to any non-transitory medium that is capable of storing, encoding or carrying the set of instructions 350 for execution by the communication device 300 and that cause the communication device 300 to perform one or more of the methodologies of the present disclosure.

The controller 310 is also connected to a user interface 330. The user interface 330 is comprised of input devices 322, output devices 324, and software routines (not shown in FIG. 3) configured to allow a user to interact with and control software applications 352 installed on the communication device 300. Such input and output devices may include any input/output device which is now known or known in the future. The disclosure is not limited in this regard.

Figure 4:
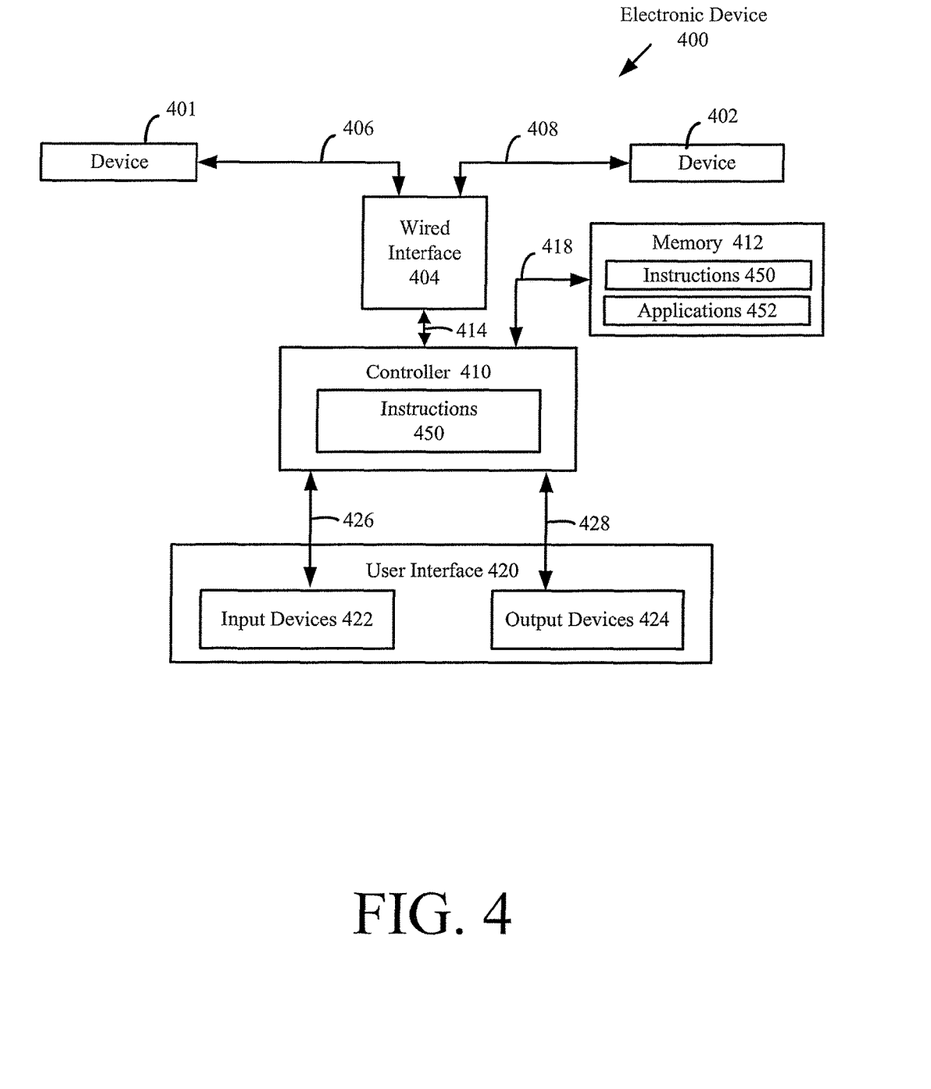
FIG. 4 is a block diagram of an example encryption device.

Referring now to FIG. 4, a diagram of an electronic device 400 is provided. As shown in FIG. 4, the electronic device 400 may include a wired interface 404 coupled to a controller 410 over connection 414. Wired interface 404 allows for secure transmitting and receiving of encryption signals. Encryption signals are used to transmit information to another device (e.g., one or both of device 401 and/or device 402 via optical connections 406 and 408, respectively). Transmitted information can include encryption keys, encrypted information, and the like. The embodiments of the present disclosure are not limited in this regard.

The controller 410 stores the decoded wired interface information in a memory 412 over connection 418 of the electronic device 400. Accordingly, the memory 412 is connected to and accessible by the controller 410. The memory 412 can be a volatile memory and/or a non-volatile memory. For example, the memory 412 can include, but is not limited to, a Random Access Memory (RAM), a Dynamic Random Access Memory (DRAM), a Static Random Access Memory (SRAM), Read-Only Memory (ROM), and flash memory. Whatever type of memory is used, ECC code will be used to correct errors. The memory 412 can also have stored therein instructions 450 and one or more software applications 452. Memory 412 may include a highly encrypted safe where private/private encryption keys are stored.

The software applications 452 or one or more features of the software applications may include, but are not limited to, applications operative to encrypt and decrypt wired or wireless connections; operational information services, commerce services, email services, web based services, and/or electronic calendar services. As shown in FIG. 4, one or more sets of instructions 450 are also stored in the memory 412. The instructions 450 can also reside, completely or at least partially, within the controller 410 during execution thereof by the electronic device 400. In this regard, the memory 412 and the controller 410 can constitute machine-readable media. The term "machine-readable media", as used here, refers to a single non-transitory medium or multiple non-transitory media that store the one or more sets of instructions 450. The term "machine-readable media", as used here, also refers to any non-transitory medium that is capable of storing, encoding or carrying the set of instructions 450 for execution by the electronic device 400 and that cause the electronic device 400 to perform one or more of the methodologies of the present disclosure.

The controller 410 may also be connected to a user interface 420. The user interface 420 is comprised of input devices 422, connected via connection 426, output devices 424, connected via connection 428, and software routines (not shown in FIG. 4) configured to allow a user to interact with and control software applications 452 installed on the electronic device 400. Such input and output devices may include any input/output device which is now known or known in the future. The disclosure is not limited in this regard.

Wired interface 404 may include an input/output port which is only used for receiving encryption keys from electronic device 300 or other electronic devices. Wired interface 404 may also include one or more additional ports for sending and/or receiving encrypted data over a network.

Figure 5:
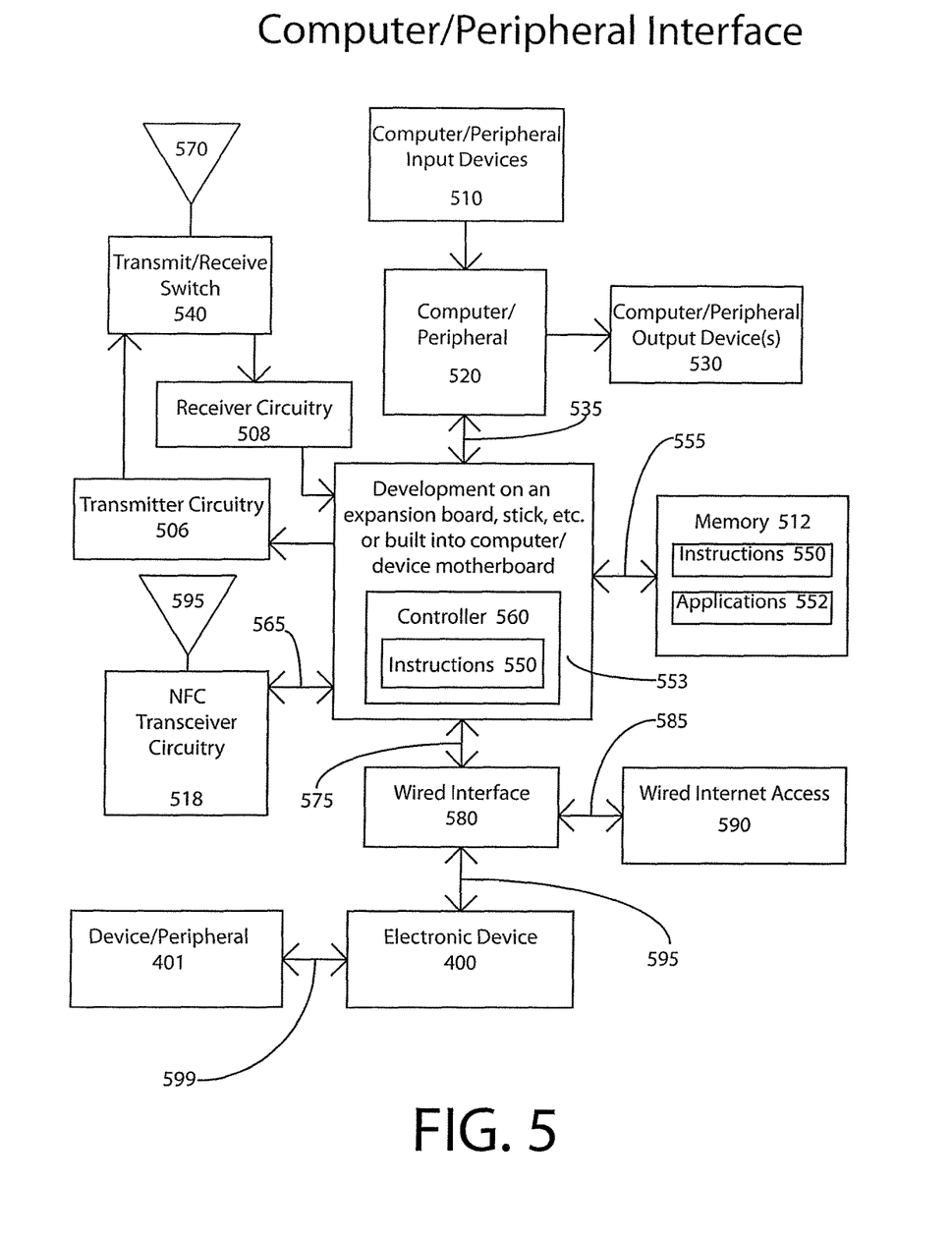
FIG. 5 is a block diagram of an example computer/peripheral interface.

Referring to FIG. 5, a computer/peripheral 520 with input devices 510, and output devices 530. An expansion board, motherboard, or other expansion device with the development incorporated into it 553 is connected to the computer/peripheral 520 via electrical connection 535. This is for connecting to an external development 400 in order to encrypt the connection to the electronic device 400, and receive sets of one or more private/private security keys submitted to both Device 401 and to be stored encrypted in memory 512 (such as ECC SSD storage) over electrical connection 555 on the computer/peripheral for communication with other peripherals using NFC 518 over antenna 595, connected to the development 553 via electrical connection 565, or for internet access from your ISP either wired 590 over electrical connection 575, through wired interface 580, over electrical connection 585 out to wired internet access 590, or wirelessly using Transmitter Circuitry 506, Transmit/Receive Switch 540 using antenna 570, and Receiver Circuitry 508. The development uses instructions 550 and applications 552 to encrypt the connection to electronic device 400 to retrieve a plurality of sets of one or more private/private security keys which are delivered to device/peripheral 401 over optical wired connection 595 to electronic device 400 and over optical wired connection 599 to device/peripheral 401 in order to later communicate wirelessly with device/peripherals 401. ISPs can also send private/private encryption keys to the development's controller 560, where it is saved to memory 512 over electrical connection 555 for secure wired internet access 590 over wired interface 580 and electrical connection 585.

Figure 6:
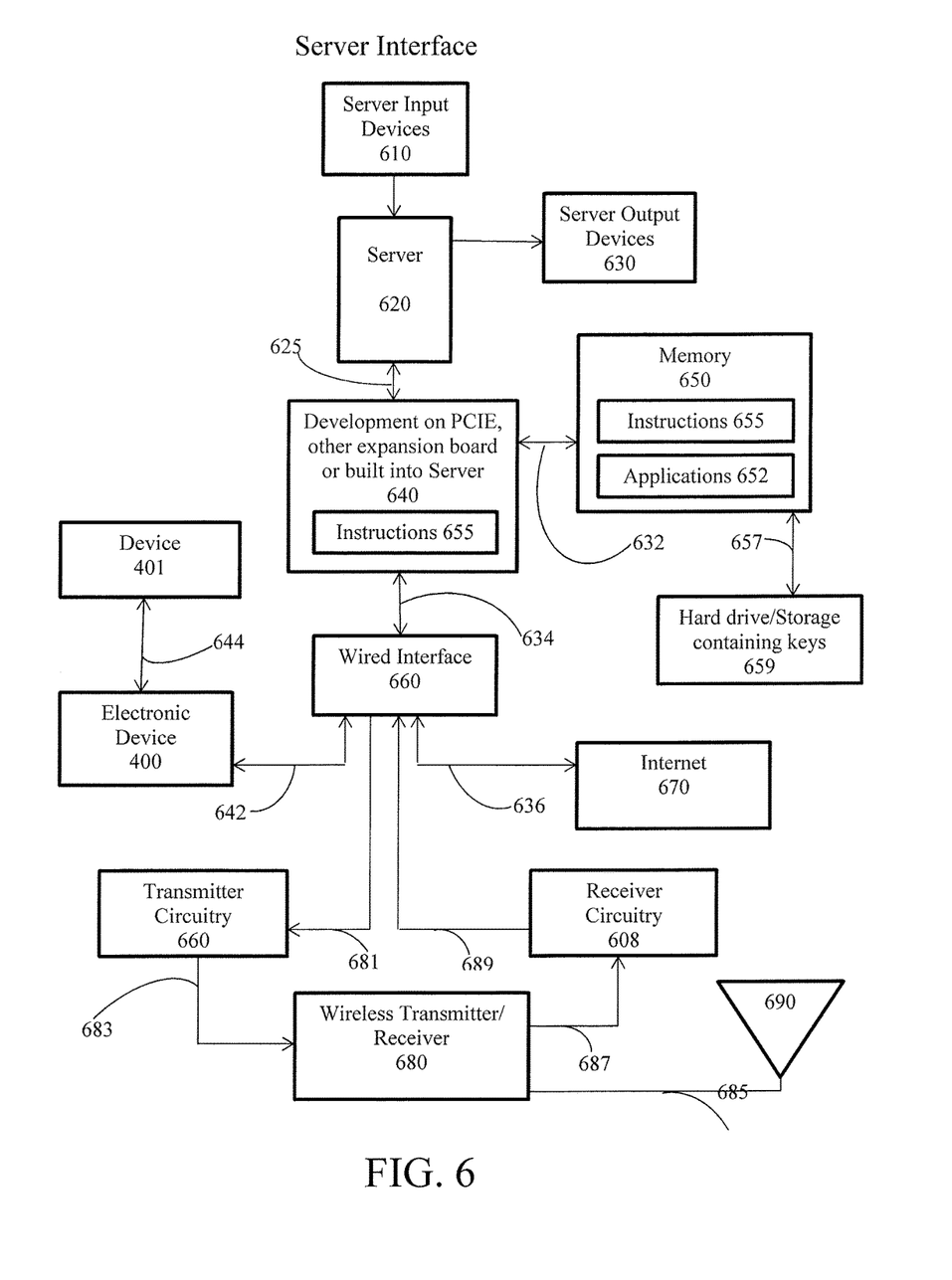
FIG. 6 is a block diagram of an example server interface.

Referring to FIG. 6, it illustrates a server 620 with input devices 610 and output devices 630. The server has an expansion board or motherboard 640 with the development incorporated into it which communicates with the server over connection 625. It gathers sets of private/private security keys from customers' devices 401 over connection 644 to device 400 which acts as a filter, protecting the server 620 and sends the keys over connection 642 through the wired interface 660 over connection 634 to development 640, over connection 632, and saves it to volatile or non-volatile memory 650. Once it has customers' private/private security keys, it uses instructions 655 and applications 652 to store them in an encrypted safe stored on hard drive/long term storage 659 over connection 657. Keys are retrieved as needed from storage 659 over connection 657, then stored in memory 650, and used to encrypt/decrypt user's data. It then connects to the users' devices wirelessly using connection 681 to transmitter circuitry 606 via connection 683 to, wireless transmitter/receiver 680 over connection 688 to, antenna 690 and over connection 687 to back receiver circuitry 608 and over connection 689 back to wired interface 660. It then allows users to connect to the internet 670 over connection 636, through wired interface 660 so users can connect to the internet safely over a private/private encrypted wireless connection using their wireless devices.

Figure 7:
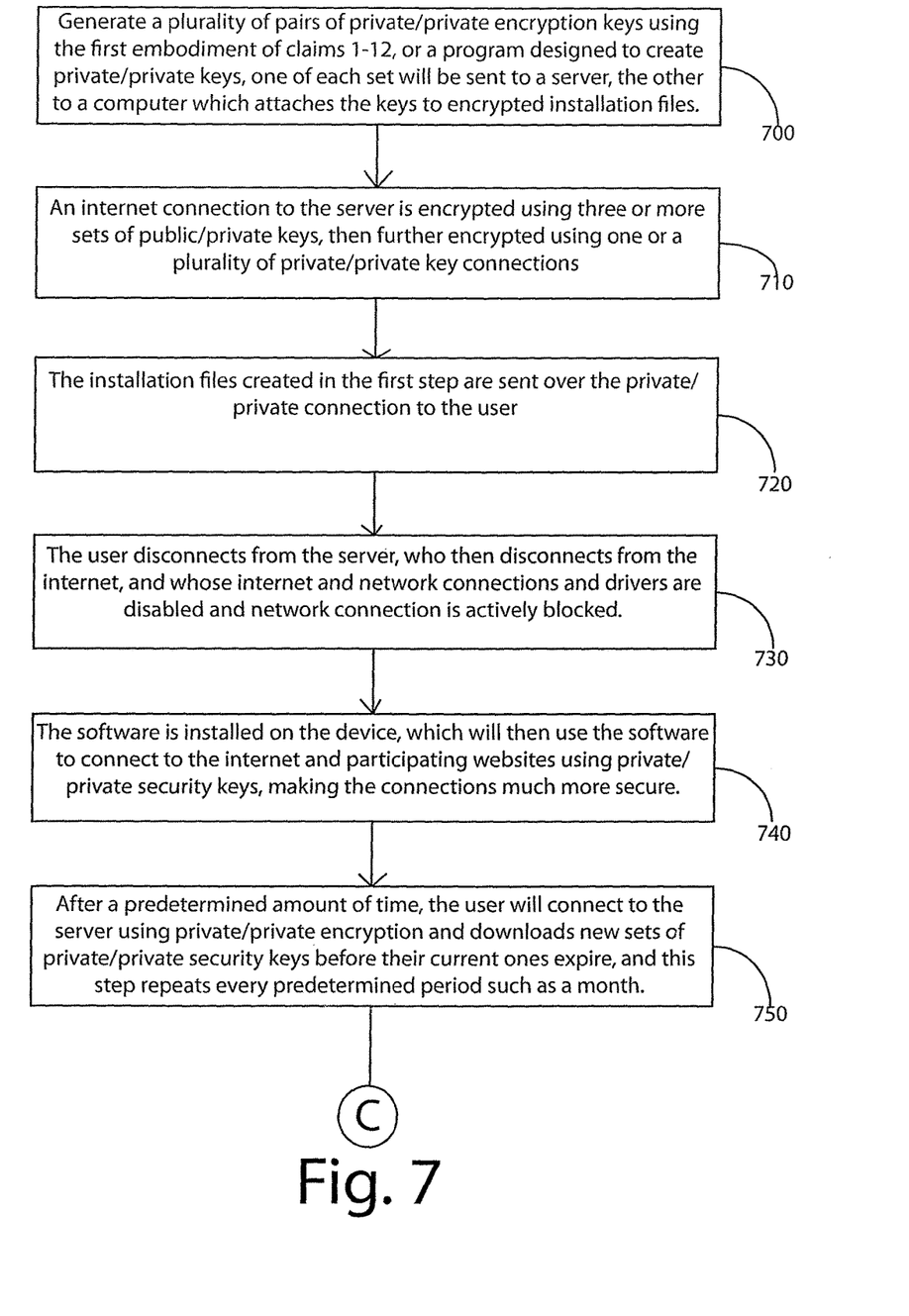
FIG. 7 is a flow chart showing a method of encrypting a data connection.

Referring to FIG. 7, a server with the development, or a software private/private encryption key generator creates sets of private/private security keys based on random number seeds generated by a plurality of inputs and attaches them to web connection/browser software 700. An encrypted connection is created between the user and server using first multiple sets of public/private keys, then one or a plurality of private/private keys 710. The installation file(s) are then sent over the private/private connection to the user 720. The user then disconnects from the server and the internet, and all network connections and drivers are disabled, and the network is actively blocked 730. The downloaded software is installed on the device, which will use the software to connect the device to the internet and participating websites securely using private/private keys 740. After a predetermined amount of time, the user will connect back to the server using private/private encryption keys and download new sets of private/private keys before their current keys expire, and this step repeats every predetermined period such as a month 750.

An aspect of the disclosure includes an encryption method for use in wireless communications, first using a direct wired connection which cannot be eavesdropped upon without detection to generate highly secure private/private encryption keys for wireless or internet use. The method includes generating a long random number, by use of a very long encryption key generator that is either an external device that connects to the first and second devices, or is either the first or second device that connects to the first or second device so that the data cannot be eavesdropped upon without detection, and generates a random number seed from a plurality of inputs.

The method and/or system may also include generating, by the external very long encryption key generator, a set of public/private encryption keys based on the random number seed previously generated.

The method and/or system may also include encrypting the connection between the development and the first and second devices, or the first and second devices using the public/private encryption keys and a randomly selected encryption protocol from a pool of many encryption protocols, less the one selected, so that all encryption protocols used are different.

The method and/or system may also include generating, by use of the very long external encryption key generator, a plurality of random number seeds using different random number seeds generated by the plurality of inputs.

The method and/or system may also include generating, by the very long external encryption key generator, a plurality of very long public/private encryption keys one at a time based on the plurality of random number seeds generated.

The method and/or system may also include further encrypting the direct wired connection between the first and second devices using the plurality of public/private very long encryption keys generated above using randomly selected encryption protocols minus the one(s) already selected for each set of keys, and repeating the last three steps and this one until a plurality of secure connections of different random protocols are created on top of one another over the direct wired connection. On top of this, one or more private/private secure connections may also be created to further secure the connection.

The method and/or system may also include generating, by use of the very long external encryption key generator, a plurality of random number seeds using different input data from a plurality of inputs.

The method and/or system may also include generating, by use of the very long external encryption key generator or the first or second devices, a plurality of very long private/private encryption keys of a plurality of different randomly selected encryption protocols minus the protocols already selected per set of private/private encryption keys.

The method and/or system may also include transmitting over the multiple encrypted direct wired connection, one or more groups of three or more private/private encryption keys of a plurality of different randomly selected encryption protocols.

The method and/or system may also include saving on both the first and second devices in very highly encrypted safes the plurality of groups of three or more very long private/private encryption keys with time/date stamps on each group for when they are to be used and then later destroyed after use.

The method and/or system may also include disconnecting the direct wired connections from both the first and second devices.

The method and/or system may also include connecting, using wireless or internet technology, the first device to the second device, using a first set of private/private encryption keys stored in the highly encrypted safes on the first and second devices without the use of any public keys.

The method and/or system may also include destroying, using guttman or a similar wiping protocol, after a predetermined amount of time such as a month, the used sets of very long private/private encryption keys, on the first and second devices.

The method and/or system may also include reconnecting, using wireless or internet technology, the first device to the second device using the next set of highly secure private/private encryption keys stored in the highly encrypted safe on the first and second devices at the predetermined time, for as many sets of a plurality of three or more private/private encryption keys of various protocols as is stored on each device such as twelve sets for a year of secure wireless encryption.

The method and/or system may also include destroying, after the predetermined amount of time, the last remaining set of highly encrypted private/private very long encryption keys on the first and second devices, when both devices will stop functioning wirelessly or over the internet until directly reconnected wired to the first and second devices, or connecting the first and second devices using the external very long encryption key generator, going back to the first step, where this process repeats using a newer, upgraded encryption chip that encrypts at a higher bitrate, and/or using newer technology and/or using more or different encryption protocols.

The method and/or system may also include ceasing to function, after a predetermined amount of time, such as a period of years, all devices, including, if used, an external very long encryption key generator, which will stop working until a new higher bitrate upgraded encryption/decryption chip and BIOS is installed in all devices.

The method and/or system may also include shutting down any wireless or other wired hardware and drivers on the first and second devices so they cannot be hacked wirelessly or wired during key generation.

The method and/or system may also include the filtering of any data sent to the development of first and second devices such that any data not expected outside certain parameters will be blocked. So they may not be used to corrupt the process.

The method and/or system may also include that no other wireless protocols be allowed on the first or second devices or the development.

The method and/or system may also include that a power source and battery will be used to keep the power supply constant. Any change in voltage may cause the process to restart.

The method and/or system may also include that all other ports, memory card slots and related drivers may be deactivated during this process.

The method and/or system may also include the use of a second CPU whose results will be compared to the first and if they do not agree, it will try again. Multiple failures will cause the process to restart and notify the user of a hacking attempt.

The method and/or system may also include logic wherein multiple ECC failures may cause the process to restart and alert the user of hacking attempt.

The method and/or system may also include that data from the inputs such as video, audio, touchpad, and others may be stored in an non-executable format.

The method and/or system may also include that the peripherals connected to the development accept expected data within the parameters of each type of device. For example, printers may only accept color and location data. Anything outside those data types may be ignored.

The method and/or system may also include that all circuitry except for the development will be shut down during the key generation and saving process.

The method and/or system may also include that the development's circuitry on both devices also contains the SSD or other storage capacity to store the encryption keys in the development's circuitry.

The method and/or system may also include that the first and second devices have the development built into them.

The method and/or system may also include that all wireless encryption and decryption may be done on the first and second devices by the development on each device.

The method and/or system may also include that the external development's encrypted keys may be transferred to one server which uses the development to encrypt data on their network then destroys the keys on the external development.

The method and/or system may also include a server which uses expansion boards with the development on them.

The method and/or system may also include a server expansion board with a secondary digital optical part for accepting new users into their network.

The method and/or system may also include an external device with the development located on it which uses fiber optic connections of multiple different frequencies in both directions that receives power by carbon fiber, nanotubes or similar connections which do not generate strong electromagnetic radiation which can be used to spy on the connection, and which can detect a drop in light intensity signifying a tap on the line which will alert the user that the line has been tapped if the intensity drops.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. An encryption device for establishing encrypted communications channels between a plurality of devices comprising:
   a processor with memory;
   a plurality of separate connections for connecting each of the plurality of devices;
   one or more peripherals; and
   software, stored in said memory and executed by said processor, said software configured to cause said processor to perform the steps of:
   a. reading data from said one or more peripherals and generating one or more random number seeds from said data;
   b. generating a set of public/private encryption keys using one of said random number seeds;
   c. encrypting each of the plurality of connections to said plurality of devices using a separate one of said set of public/private encryption keys over each of said plurality of separate connections, respectively;
   d. generating a set of private/private encryption keys using one or more of said random number seeds; and
   e. transmitting a separate one of said set of private/private encryption keys to each of said plurality of devices over said plurality of separate connections, respectively.

2. The encryption device of claim 1 wherein said encryption device is one of the plurality of devices.

3. The encryption device of claim 1 wherein one or more of said peripherals are selected from a group of peripherals consisting of a digital camera, a microphone, a touchpad, a clock and, a random number generator.

4. The encryption device of claim 1 wherein said software, when executed by the processor, performs steps (b) and (c) multiple times to create redundantly encrypted communications between said encryption device and said plurality of devices.

5. The encryption device of claim 4 wherein different encryption protocols are used each time the connection between said encryption device and said plurality of devices, such that the connection is redundantly encrypted.

6. The encryption device of claim 1 wherein said public/private encryption keys and said private/private encryption keys have a length of 2048 bits or more.

7. The encryption device of claim 1 wherein said software, when executed by the processor, prior to performing step (d), further performs a step of generating private/private encryption keys using one of said random number seeds for further encrypting the connections to said plurality of devices.

8. The encryption device of claim 7 wherein a random encryption protocol is used to encrypt the connections to said plurality of devices using said private/private encryption keys.

9. The encryption device of claim 1 wherein, when said software is performing (e), one or more groups of private/private encryption keys are transmitted to each of said plurality of devices over said plurality of separate connections, respectively.

10. The encryption device of claim 1 wherein said encryption device can detect when a connection with any of said plurality of devices has been breached or spliced.

11. The encryption device of claim 1 wherein said encryption device communicates specific information with each of said plurality of devices over said plurality of separate connections respectively, and further wherein any unexpected transmitted data will be rejected by said encryption device and each of the plurality of devices.

12. The encryption device of claim 11 wherein said specific information comprises information selected from the group consisting of date/time stamps, software version numbers, encryption protocols and encryption keys.

13. The encryption device of claim 1 wherein said encryption device stores any number of said encryption keys in said memory for later use decrypting communications between devices, and deletes said encryption keys after a predetermined period of time.

14. The device of claim 13 wherein, one of said plurality of devices receives one or more groups of private/private encryption keys over said plurality of separate connections.

15. The device of claim 14 wherein, one or more groups of encryption keys are used to redundantly encrypt any connection with a selected device of said plurality of devices.

16. The device of claim 15 wherein each of said groups of encryption keys has an associated encrypted date/time stamp indicating when said encryption keys can be validly used with said selected device, and when the date/time stamp indicates that the currently used group of encryption keys is no longer valid, another group of encryption keys is selected.

17. The device of claim 16 wherein said plurality of devices are unable to connect to said selected device using the generated private/private keys when no valid groups of encryption keys remain stored in said memory for said selected device.

* * * * *